US011436133B2

(12) United States Patent
Shani et al.

(10) Patent No.: US 11,436,133 B2
(45) Date of Patent: Sep. 6, 2022

(54) COMPARABLE USER INTERFACE OBJECT IDENTIFICATIONS

(71) Applicant: ENTIT SOFTWARE LLC, Sanford, NC (US)

(72) Inventors: Inbar Shani, Yehud (IL); Ilan Shufer, Yehud (IL); Amichai Nitsan, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 858 days.

(21) Appl. No.: 16/086,176

(22) PCT Filed: Mar. 23, 2016

(86) PCT No.: PCT/US2016/023655
§ 371 (c)(1),
(2) Date: Sep. 18, 2018

(87) PCT Pub. No.: WO2017/164856
PCT Pub. Date: Sep. 28, 2017

(65) Prior Publication Data
US 2020/0310952 A1 Oct. 1, 2020

(51) Int. Cl.
G06F 11/36 (2006.01)
G06F 16/28 (2019.01)
(Continued)

(52) U.S. Cl.
CPC ...... *G06F 11/3692* (2013.01); *G06F 11/3688* (2013.01); *G06F 16/252* (2019.01); *G06F 16/285* (2019.01); *G06F 3/0484* (2013.01)

(58) Field of Classification Search
CPC .. G06F 11/3692; G06F 16/285; G06F 16/252; G06F 11/3688; G06F 3/0484
(Continued)

(56) References Cited

U.S. PATENT DOCUMENTS 6,993,682 B2 * 1/2006 Corrie ...................... G06F 8/36
714/38.14
7,421,683 B2 9/2008 Robertson et al.
(Continued)

OTHER PUBLICATIONS

Grechanik, M., et al., Maintaining and Evolving GUI-directed Test Scripts, Jan. 17, 2009, Retrieved from: <https://www.cs.uic.edu/~drmark/index_htm_files/Rest.pdf>, 11 pages.
(Continued)

*Primary Examiner* — Manglesh M Patel

(57) ABSTRACT

Example implementations relate to comparable UI object identifications. Some implementations may include a data capture engine to capture data points during test executions of the application under test. The data points may include, for example, test action data and application action data. Additionally, some implementations may include a data correlation engine to correlate each of the data points with a particular test execution of the test executions, and each of the data points may be correlated based on a sequence of events that occurred during the particular test execution. Furthermore, some implementations may also automatically identify, based on the correlated data points, a set of comparable UI objects.

17 Claims, 7 Drawing Sheets

(51) Int. Cl.
*G06F 16/25* (2019.01)
*G06F 3/0484* (2022.01)

(58) Field of Classification Search
USPC .................. 715/764, 200, 853; 714/38.1
See application file for complete search history.

(56) References Cited

U.S. PATENT DOCUMENTS

| | | |
|---|---|---|
| 7,451,455 B1 | 11/2008 | El-Haj |
| 7,900,192 B2 | 3/2011 | Patterson |
| 7,917,895 B2 | 3/2011 | Givoni et al. |
| 8,701,092 B1 | 4/2014 | Colcord |
| 9,075,918 B1 | 7/2015 | Chandra et al. |
| 9,405,665 B1* | 8/2016 | Shashi ................ G06F 11/3688 |
| 9,507,700 B1* | 11/2016 | Vignet ................ G06F 11/3688 |
| 9,600,401 B1* | 3/2017 | Haischt ............... G06F 11/3664 |
| 2008/0115114 A1* | 5/2008 | Palaparthi ........... G06F 11/3688 |
| | | 717/128 |
| 2011/0099499 A1 | 4/2011 | Pnueli et al. |
| 2011/0161874 A1 | 6/2011 | Doughty et al. |
| 2012/0166876 A1 | 6/2012 | Zambrana |
| 2012/0246621 A1 | 9/2012 | Mukkavilli |
| 2015/0026524 A1 | 1/2015 | Cao et al. |
| 2018/0197103 A1* | 7/2018 | Petursson ............. G06N 20/00 |
| 2021/0073286 A1* | 3/2021 | Hunter ................ H04L 63/123 |

OTHER PUBLICATIONS

International Searching Authority, International Search Report and Written Opinion dated Apr. 20, 2017 for PCT Application No. PCT/US2016/023655 Filed Mar. 23, 2016, 13 pages.

\* cited by examiner

COMPARABLE UI OBJECT IDENTIFICATION VISUALIZATION

Feature 3833 – Create Releases 🔍 910

1. Navigate to release quality
2. Create a new release entity
3. Customize the new release product tree, add child product areas
4. Select a user story and assign it to new product areas
5. Filter product tree by release

920

User Actions:
'Product Area'.click
'Product Area'.Selected 'Area X1'

930

UI Objects
'Add Child' [Button]
'Home | Release' [Navigation Bar]

Find Similar

940

Application Actions
POST /server/releases
GET /server/product_areas
GET /server/releases/21/areas

950

Set of Comparable UI Objects
Comparison to 'Add Child' [Button] in Feature 3833

| Attribute | Value | Identification Score |
|---|---|---|
| ID | Ods_23 | 0.5 |
| Text | Add Child | 0.9 |
| Color | [0,0,255] | 0.35 |

COMPARABLE USER INTERFACE OBJECT IDENTIFICATIONS

BACKGROUND

Application testing may be performed to provide information about an application under test ("AUT"), such as whether the AUT includes any errors or other defects. One type of application testing is UI testing, where different UI objects (e.g., buttons, icons, menu bars, and the like) are tested to determine whether they function correctly. In some circumstances, UI testing may be performed using automated testing tools that simulate a user interaction with the AUT.

BRIEF DESCRIPTION OF THE DRAWINGS

The following detailed description references the drawings, wherein:

FIG. 9 is an example illustration of a comparable UI object identification visualization consistent with disclosed implementations.

DETAILED DESCRIPTION

Figure 1:
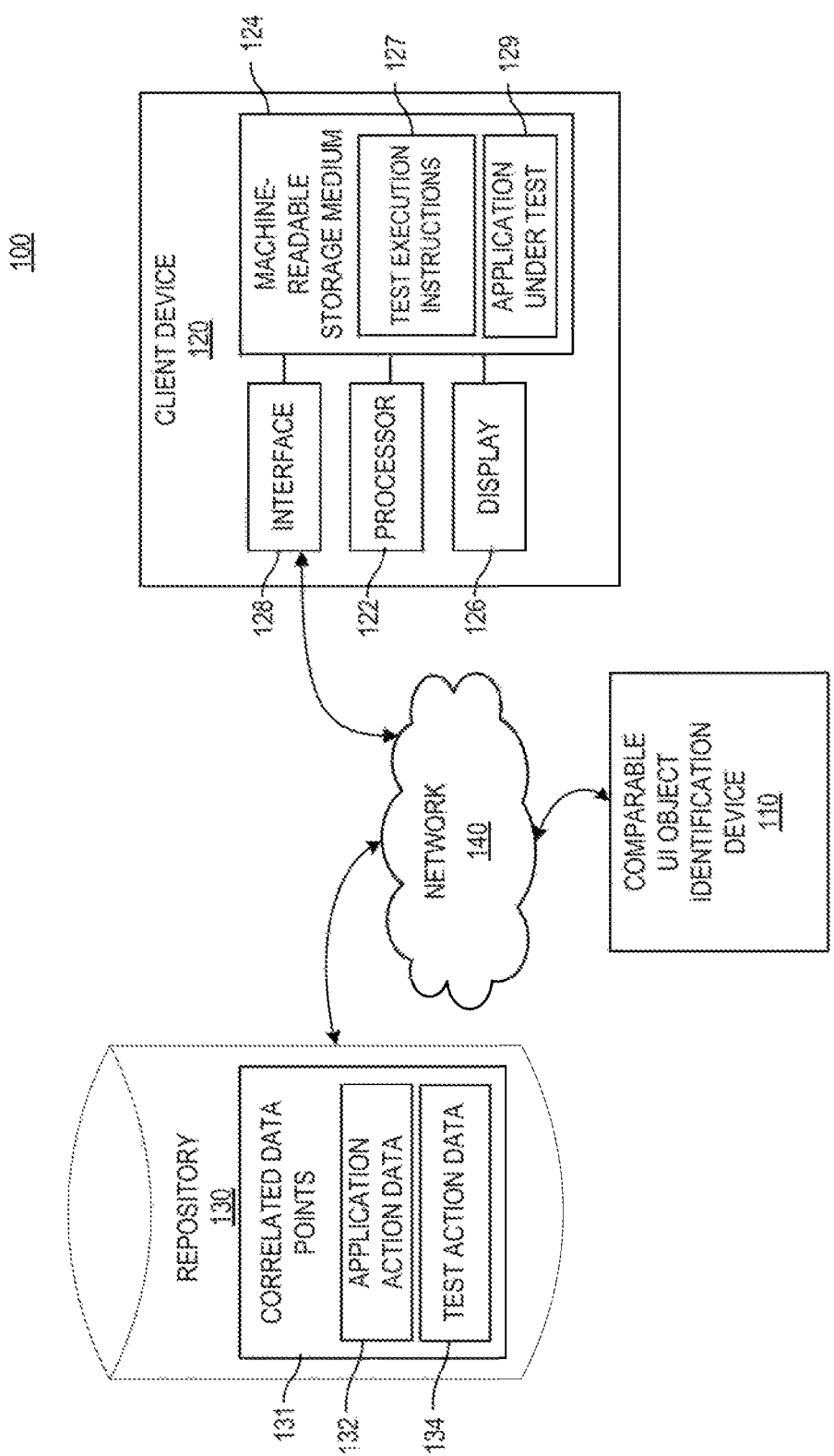
FIG. 1 is a block diagram of an example system for comparable UI object identifications consistent with disclosed implementations.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As discussed above, UI testing may be performed on an AUT using automated testing tools. For example, testers may generate an automation script that includes desired testing functions (e.g., keystrokes, mouse clicks, etc.) to simulate a user interaction with the AUT. However, a potential challenge in generating these scripts may include properly identifying UI objects in a way that the desired testing functions can be properly applied to the correct UI objects (e.g., button, menu item, etc.). Some methods of UI object identification may attempt to identify UI objects based on their attributes. For example, a UI object (such as a button) may have a number of attributes such as title, size, color, length, and the like. However, many objects in the UI may share common attributes, so referring to specific attributes may not sufficiently differentiate one UI object from another. Additionally, if an attribute of the UI object was changed during testing, an automation script that was generated based on that attribute may fail when executed, making the script unstable. Accordingly, selecting attributes that will be unique among other UI objects and stable across AUT instances and versions can be challenging.

Examples disclosed herein may provide comparable UI object identifications. To this end, some examples may capture data points during test executions of an AUT, correlate each of the data points with a particular test execution, and automatically identify, based on the correlated data points, a set of comparable UI objects. A comparable UI object may considered to be a UI object that is similar to a particular UI object (e.g., a selected UI object), where the similarity is based on an AUT context of interaction with the UI objects (e.g., user interaction with the application and corresponding application response). In some implementations, the similarity may also be based on similarity of the attributes and values of a particular UI object (e.g., a selected UI object) to the attributes and values of other UI objects. A set of comparable UI objects may be considered to be a collection of a non-zero number (e.g., 1, 3, 100) of UI objects. In some implementations, the set of comparable UI objects may be identified based on a context in which a selected UI object was interacted with. Additionally, in some implementations, attributes related to the set of comparable UI objects may be displayed on a display device using a comparable UI object identification visualization. For example, the visualization may be displayed in a manner that would allow a tester to determine attributes of the comparable UI objects, an identification score (e.g., a uniqueness-based identification score) associated with the attributes, and the like. Testers may then use that information to determine UI object attributes are unique and stable, and use those determined attributes in the generation of their automation scripts.

Referring now to the drawings, FIG. 1 is a block diagram of an example system 100 for comparable UI object identifications consistent with disclosed implementations. System 100 may be implemented in a number of different configurations without departing from the scope of the disclosed examples. In the example shown in FIG. 1, system 100 may include a comparable UI object identification device 110, a client device 120, a repository 130, and a network 140 for connecting comparable UI object identification device 110 with client device 120 and/or repository 130.

Comparable UI object identification device 110 may be a computing system that performs various functions consistent with disclosed examples. For example, comparable UI object identification device 110 may be a server, a desktop computer, a laptop computer, and/or any other suitable type of computing device(s). In some examples, comparable UI object identification device 110 may process information received from client device 120 and/or repository 130. For example, comparable UI object identification device 110 may automatically identify a set of comparable UI objects based on data captured from client device 120 and/or received from repository 130. Examples of comparable UI object identification device 110 and certain functions that may be performed by device 110 are described in greater detail below with respect to, for example, FIGS. 2-9.

Client device 120 may be a computing system operated by a user. For example, client device 120 may be a desktop computer, a laptop computer, a tablet computing device, a mobile phone, and/or any other suitable type of computing device(s). In some examples, client device 120 may be a computing device to perform operations consistent with certain disclosed implementations. For example, client device 120 may be adapted to transmit data related to test executions of an AUT to comparable UI object identification device 110.

Client device 120 may include a processor to execute instructions stored in a machine-readable storage medium. In the example shown in FIG. 1, client device 120 may include a processor 122, a machine-readable storage medium 124, a display device 126, and an interface 128. Processor 122 of client device 120 may be at least one processing unit (CPU), microprocessor, and/or another hardware device to execute instructions to perform operations. For example, processor 122 may fetch, decode, and execute instructions stored in machine-readable storage medium 124 (such as test execution instructions 127 (e.g., instructions related to a particular test execution) and/or AUT instructions 129 (e.g., instructions related to the AUT)) to test an AUT. While in the example shown in FIG. 1 the AUT resides on client device 120, test execution instructions 127 and/or AUT instructions 129 may reside on different machines and/or may span multiple computing systems. Machine-readable storage medium 124 may be any electronic, magnetic, optical, or other non-transitory storage device that stores instructions executed by processor 122. Display 126 may be any type of display device that presents information, such as a UI of an AUT, a comparable UI object identification visualization, and the like, to a user (e.g., a tester) operating client device 120. Interface 128 may be any combination of hardware and/or programming that facilitates the exchange of data between the internal components of client device 120 and external components, such as comparable UI object identification device 110. In some examples, interface 128 may include a network interface device that allows client device 120 to receive and send data to and from various components, such as to and from comparable UI object identification device 110 via network 140.

Repository 130 may be any type of storage system configuration that facilitates the storage of data. In some implementations, repository 130 may facilitate the locating, accessing, and retrieving of data points captured during test executions of an AUT (e.g., SaaS, SQL, Access, etc. databases). For example, repository 130 may store correlated data points 131, which may include application action data 132 and test action data 134 (described in further detail below). While in the example shown in FIG. 1 the correlated data points 131 reside in repository 130, any portion of the correlated data points 131 may reside on different storage systems.

Repository 130 can be populated by a number of methods. For example, comparable UI object identification device 110 may populate repository 130 with data points captured and correlated by comparable UI object identification device 110, and store the correlated data points 131 in repository 130. In some implementations, the data points may be stored as a directed acyclic graph ("DAG"). Traditionally, a DAG is a directed graph formed by a collection of vertices (e.g., a fundamental unit of which the graph is formed) and directed edges (e.g., an edge that points from a first vertex in the collection of vertices to a second vertex in the collection of vertices). A DAG, as used herein, doesn't necessarily mean a graphic representation of the data included in a traditional DAG. Instead, a DAG as used herein may include the graphic representation and/or a data structure that stores the data points in a manner that allows system 100 to determine data represented by the traditional DAG (e.g., categorization of the data points, directed edges associated with particular data points, and/or vertices associated with the data points). In some examples, the data structure may be an array, a record, a database entry, a lookup table, a hash table, a map, a tree, a linked list, and/or any other type of data structure. An example of a DAG consistent with disclosed implementations is discussed in more detail below with respect to, for example, FIG. 5.

While in the example shown in FIG. 1 repository 130 is a single component external to components 110 and 120, repository 130 may comprise separate components and/or may be part of devices 110, 120, and/or another device. In some implementations, repository 130 may be managed by components of device 110 and/or other devices that are capable of accessing, creating, controlling and/or otherwise managing data remotely through network 140.

Network 140 may be any type of network that facilitates communication between remote components, such as comparable UI object identification device 110 and client device 120. For example, network 140 may be a local area network (LAN), a wide area network (WAN), a virtual private network, a dedicated intranet, the Internet, and/or a wireless network.

The arrangement illustrated in FIG. 1 is simply an example, and system 100 may be implemented in a number of different configurations. For example, while FIG. 1 shows one comparable UI object identification device 110, client device 120, repository 130, and network 140, system 100 may include any number of components 110, 120, 130, and 140, as well as other components not depicted in FIG. 1. For example, system 100 may omit any of components 110, 120, 130, and 140, and/or the functionality of at least one of components 110, 120, 130, and 140 may be incorporated into another component (e.g., components 110, 120, 130, 140, and/or a component not shown in FIG. 1).

Figure 2:
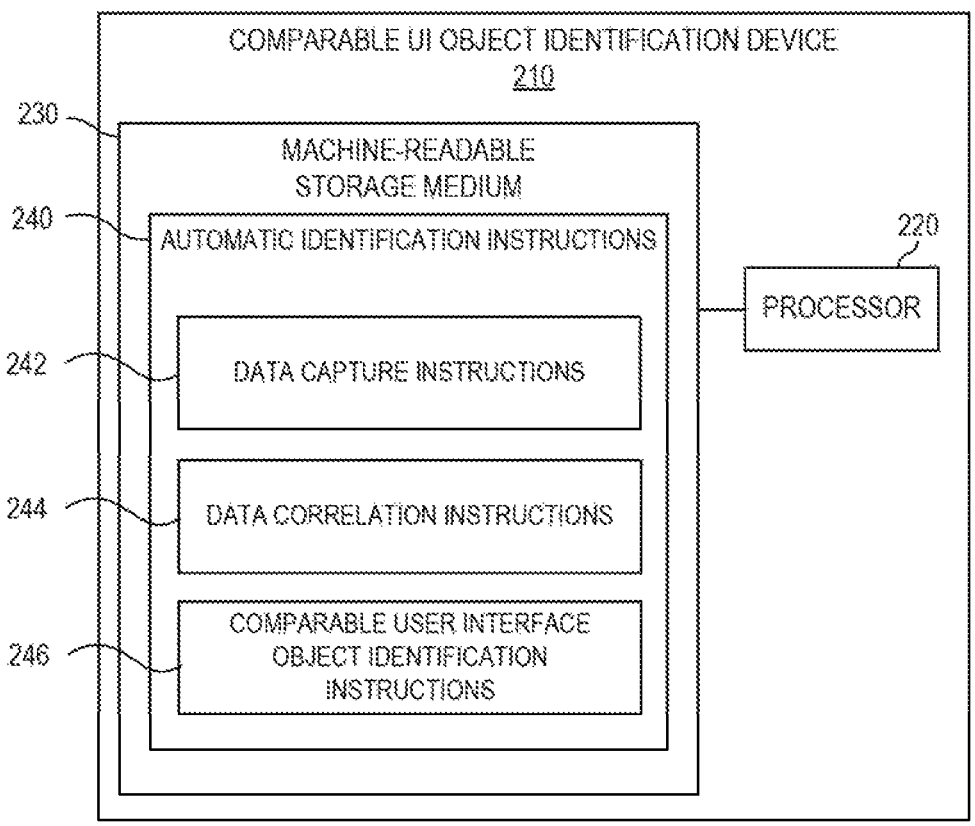
FIG. 2 is a block diagram of an example comparable UI object identification device consistent with disclosed implementations.

FIG. 2 is a block diagram of an example comparable UI object identification device 210 consistent with disclosed implementations. In certain aspects, comparable UI object identification device 210 may correspond to comparable UI object identification device 110 of FIG. 1. Comparable UI object identification device 210 may be implemented in various ways. For example, device 210 may be a special purpose computer, a server, a mainframe computer, and/or any other suitable type of computing device(s). In the example shown in FIG. 2, comparable UI object identification device 210 may include a processor 220 and a machine-readable storage medium 230.

Processor 220 may be at least one processing unit (CPU), microprocessor, and/or another hardware device to execute instructions to perform operations. For example, processor 220 may fetch, decode, and execute automatic identification instructions 240 (e.g., instructions 242, 244, and/or 246) stored in machine-readable storage medium 230 to perform operations consistent with disclosed examples.

Machine-readable storage medium 230 may be any electronic, magnetic, optical, and/or other physical storage device that stores executable instructions. Thus, machine-readable storage medium 230 may be, for example, memory, a storage drive, an optical disc, and the like. In some implementations, machine-readable storage medium 230 may be a non-transitory machine-readable storage medium, where the term "non-transitory" does not encompass transitory propagating signals. Machine-readable storage medium 230 may be encoded with instructions that, when executed by processor 220, perform operations consistent with disclosed implementations. For example, machine-readable storage medium 230 may include instructions that perform operations for comparable UI object identifications by capturing data points during test executions of an AUT, correlating each of the data points with a particular test execution of the AUT, and automatically identify, based on the correlated data points, a set of comparable UI objects. In the example shown in FIG. 2, machine-readable storage medium 230 may include data capture instructions 242, data correlation instructions 244, and comparable UI object identification instructions 246.

Data capture instructions 242 may function to capture data points during test executions of an AUT. In some implementations, when data capture instructions 242 are executed by processor 220, data capture instructions 242 may cause processor 220 and/or another processor to capture data points during test executions of the AUT. For example, data capture instructions 242 may cause processor 220 and/or another processor to access, receive, or otherwise obtain the data points from computing systems that execute the test and/or implement the AUT during the test executions. In some examples, the data points may be captured by installing agents on various physical or virtual system components to monitor how the particular component(s) function and to transmit the data points to a storage device, such as a storage device associated with comparable UI object identification device 110. The transmitted data points may then be received and/or captured by comparable UI object identification device 110. The agents may be simple (e.g., agents monitoring a central processing unit ("CPU") that may simply ask an operating system what the CPU use level is) or complex (e.g., agents integrated with a testing tool that follow all of the test steps during test executions of an AUT). Alternatively (or in combination with the use of agents) the information may be monitored agentlessly. For example, a monitoring server may query various component(s) for information about the component's memory usage.

In some implementations, the captured data points may include application action data that includes data related to actions performed by the application under test in response to test actions performed during the test executions, the application action data may include data related to various levels of the AUT, such as a UI level (e.g., UI snapshots, UI object extractions, etc.), a code level (e.g., code executed behind the UI), a network communication level (e.g., network communications between client device 120 and comparable UI object identification device 110), a database level (e.g., databases accessed by the AUT during test execution), and an environment level (e.g., data related to the environment of the AUT such as data related to hardware (e.g., device build, CPU usage, memory usage, resource usage, etc.) and programming (e.g., operating system, browser, etc.) that are related to the execution of the test of the AUT (e.g., server logs) and/or that relate to the execution of the AUT itself (e.g., application server errors)). In some examples, the captured data points may include test action data that includes data related to the test actions performed during the test executions, such as test actions and/or steps performed during the particular test execution (e.g., start test step (e.g., data indicating that the data point is related to the start of a test step), end test step (e.g., data indicating that the data point is related to the end of a test step), report test result step (e.g., data indicating that the data point is related to a particular result of a test step), complete test step (e.g., data indicating that the data point is related to the completion of an entire test), and/or a report test step (e.g., data indicating that the data point relates to reporting the results on the entire test)), and/or metadata related to the AUT (e.g., AUT version), the particular test execution state (e.g., test date/time, tester name, etc.), and the like.

Data correlation instructions 244 may function to correlate data points. For example, when data correlation instructions 244 are executed by processor 220, data correlation instructions 244 may cause processor 220 to correlate each of the data points with a particular test execution of the AUT. In some implementations, the data points may be correlated based on a sequence of events that occurred during the particular test execution. For example, data correlation instructions 244 may cause processor 220 to generate a DAG and/or store the data in a manner that allows queries of the data to verify test steps. In some examples, the DAG and/or the correlated data points may be stored in a repository, such as repository 130. Examples of correlating data points are described in further detail below with respect to, for example, FIGS. 4 and 5.

Comparable UI object identification instructions 246 may function to automatically identify, based on the correlated data points, a set of comparable UI objects. For example, when comparable UI object identification instructions 246 are executed by processor 220, comparable UI object identification instructions 246 may cause processor 220 to identify the set of comparable UI objects by identifying commonalities between a selected UI object and other UI objects in the correlated data points. In some implementations, the commonalities may be identified based on an AUT context in which the selected UI object was interacted with. An AUT context may be considered to be a set of conditions corresponding to the interaction with the AUT, such as type of interaction, type of UI object, and corresponding application response to the UI interaction. Examples of automatically identifying a set of comparable UI objects are described in further detail below with respect to, for example, FIGS. 3-9.

Figure 3:
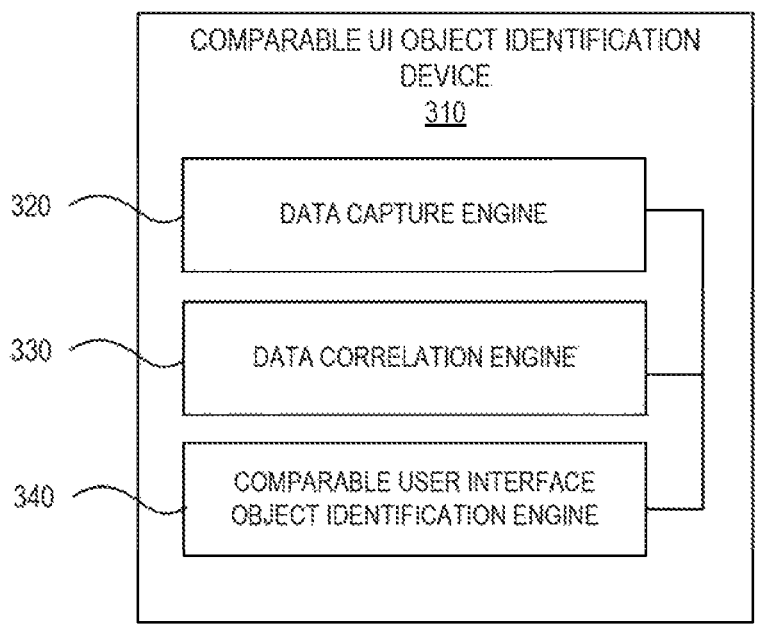
FIG. 3 is a block diagram of an example comparable UI object identification device consistent with disclosed implementations.

FIG. 3 is a block diagram of an example comparable UI object identification device 310 consistent with disclosed implementations. In certain aspects, comparable UI object identification device 310 may correspond to comparable UI object identification device 110 of FIG. 1 and/or comparable UI object identification device 210 of FIG. 2. Device 310 may be implemented in various ways. For example, device 310 may be a special purpose computer, a server, a mainframe computer, and/or any other suitable type of computing system. In the example shown in FIG. 3, device 310 may include a data capture engine 320, a data correlation engine 330, and a comparable UI object identification engine 340.

Engines 320, 330, and 340 may be electronic circuitry for implementing functionality consistent with disclosed examples. For example, engines 320, 330, and 340 may represent combinations of hardware devices and programming to implement functionality consistent with disclosed implementations. In some examples, the functionality of engines 320, 330, and/or 340 may correspond to operations performed by comparable UI object identification device 210 of FIG. 2, such as operations performed when automatic identification instructions 240 are executed by processor 220 (described above with respect to FIG. 2). In FIG. 3, data capture engine 320 may represent a combination of hardware and programming that performs operations similar to those performed when processor 220 executes data capture instructions 242. Similarly, data correlation engine 330 may represent a combination of hardware and programming that performs operations similar to those performed when processor 220 executes data correlation instructions 244, and comparable UI object identification engine 340 may represent a combination of hardware and programming that performs operations similar to those performed when processor 220 executes comparable UI object identification instructions 246.

Figure 4:
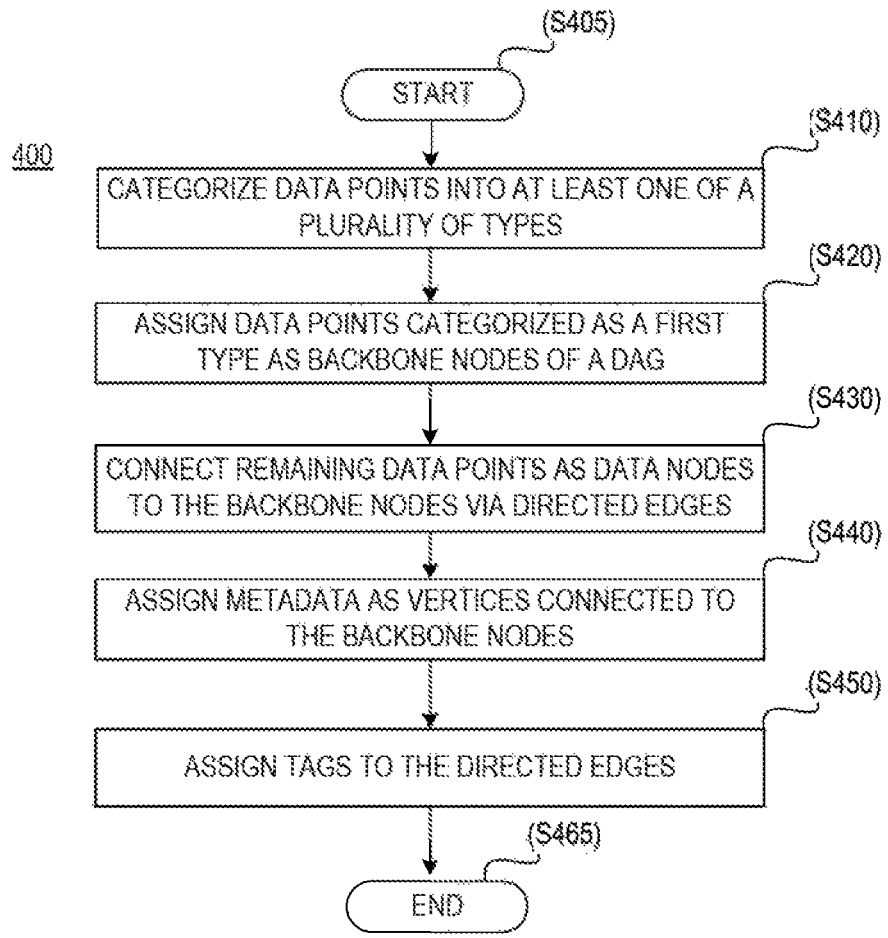
FIG. 4 is a flow chart of an example process for correlating data points consistent with disclosed implementations.

FIG. 4 is a flow chart of an example process 400 for correlating data points consistent with disclosed implementations. Although execution of process 400 is described below with reference to system 100 of FIG. 1 and/or specific components of system 100, other suitable systems and devices for execution of at least one step of process 400 may be used. For example, processes described below as being performed by comparable UI object identification device 110 may be performed by comparable UI object identification device 210, comparable UI object identification device 310, and/or any other suitable device. Process 400 may be implemented in the form of executable instructions stored on a non-transitory machine-readable storage medium and/or in the form of electronic circuitry.

Process 400 may start (step S405) after data points have been captured during test executions of an AUT. Once the data points have been captured, process 400 may function to correlate each of the data points by categorizing each of the data points into at least one of a plurality of types. In some implementations, the at least one of the plurality of types may include a first type (e.g., test steps). For example, the data points may be correlated by generating a DAG, such as DAG 500 of FIG. 5. In some implementations, the DAG may be generated based on timestamps associated with the data points.

Process 400 may include categorizing the data points into at least one of a plurality of types (step S410). For example, the data points may be categorized based on steps of the test execution, data type (e.g., CPU, memory, UI object, user action, network packet, etc.), a particular user (e.g., an identify of the user who was running the test), AUT build (the specific build version of the AUT when the data points were captured), and/or any other suitable categorization. In some implementations, the plurality of types may include a first type. For example, the first type may be test actions of the test execution such as, for example, steps involved in tester interaction with a UI of the AUT. As another example, the first type may be application actions of the test execution such as, for example, actions of the AUT that are performed in response to the test actions. The definition of the particular types may be predetermined, or may be based on input from a user. For example, a user may define the application action type as all actions completed by the AUT between a test action and a full update to a UI (e.g., may transmit the UI has been updated such that all of the text and/or graphics have fully loaded) of the AUT.

Process 400 may also include assigning data points categorized as the first type as backbone nodes of a DAG (step S420). For example, system 100 may assign the data points associated with test steps of the test execution as a backbone (e.g., a plurality of backbone nodes) of the DAG. Thus, in some implementations, the data points associated with test steps may be considered to be backbone nodes, and the remaining data points (e.g. data points associated with application actions) may be considered to be data nodes.

Process 400 may also include connecting remaining data points (e.g., a set of the data points that are not categorized as the first type) as data nodes to the backbone nodes via directed edges based on timestamps associated with the remaining data points (step S430). For example, the data points may be connected via directed edges from a first data point of the first type (e.g., a first test step of the test steps). In some examples, the data points may be connected based on a length of time between a time stamp associated with a particular data point of the captured data points, and a time stamp associated with the first test step. For example, system 100 may order the test steps in the backbone sequentially based on when the test steps were executed. Events associated with a particular test step may be traced and associated with the particular test step. For example, system 100 may trace UI objects. A UI scanner may run periodically and automatically identify structured objects in the UI, their attributes, and their values. As another example, system 100 may trace system events associated with a particular test steps by implementing a thread event monitor that monitors threads for a creation of an object, the run of an object, the termination of an object, and the like, and associate the creation, run, and/or termination of objects to a particular test event based on thread and object identifiers.

Process 400 may also include assigning the metadata as vertices connected to the backbone nodes (step S440). For example, system 100 may determine the elements of the backbone and may assign metadata (e.g., data points) traced to each particular element (e.g., each test step). For example, system 100 may trace the metadata based on time-relations (e.g., the event happened after a particular test step) or based on another suitable methodology (e.g., coloring network packets to trace them to a server code).

Process 400 may also include assigning tags to the directed edges to identify a type of relation between the vertices (step S450). In some implementations, system 100 may assign tags to the directed edges based on data received from the agents installed on the various physical or virtual system components. For example, the agents may include instructions, that when executed by a processor, compare an event occurring with the system to a list of rules. If the event matches a particular rule, the agent notes the tag association between events. For example, assume that the list of rules includes a use tagging rule that requires tagging a directed edge as "use" when a test step involves the usage of a browser. When a test step is executed that invokes an object named "browser," the agent may compare the invocation of the object to the list of rules and, based on the use tagging rule in the list, tag the directed edge as "use." After the data points have been categorized (step S410), the data points have been assigned (step S420), the remaining data points have been connected (step S430), the metadata has been assigned as vertices (step S440), and/or the tags have been assigned to directed edges (step S450), process 400 may end (step S465). In some implementations, the DAG generated by process 400 may be stored in a storage device. For example, the DAG may be stored in a storage device such as a non-transitory computer-readable storage medium (e.g. a machine-readable storage medium in comparable UI object identification device 110, repository 130, and/or in another device).

Figure 5:
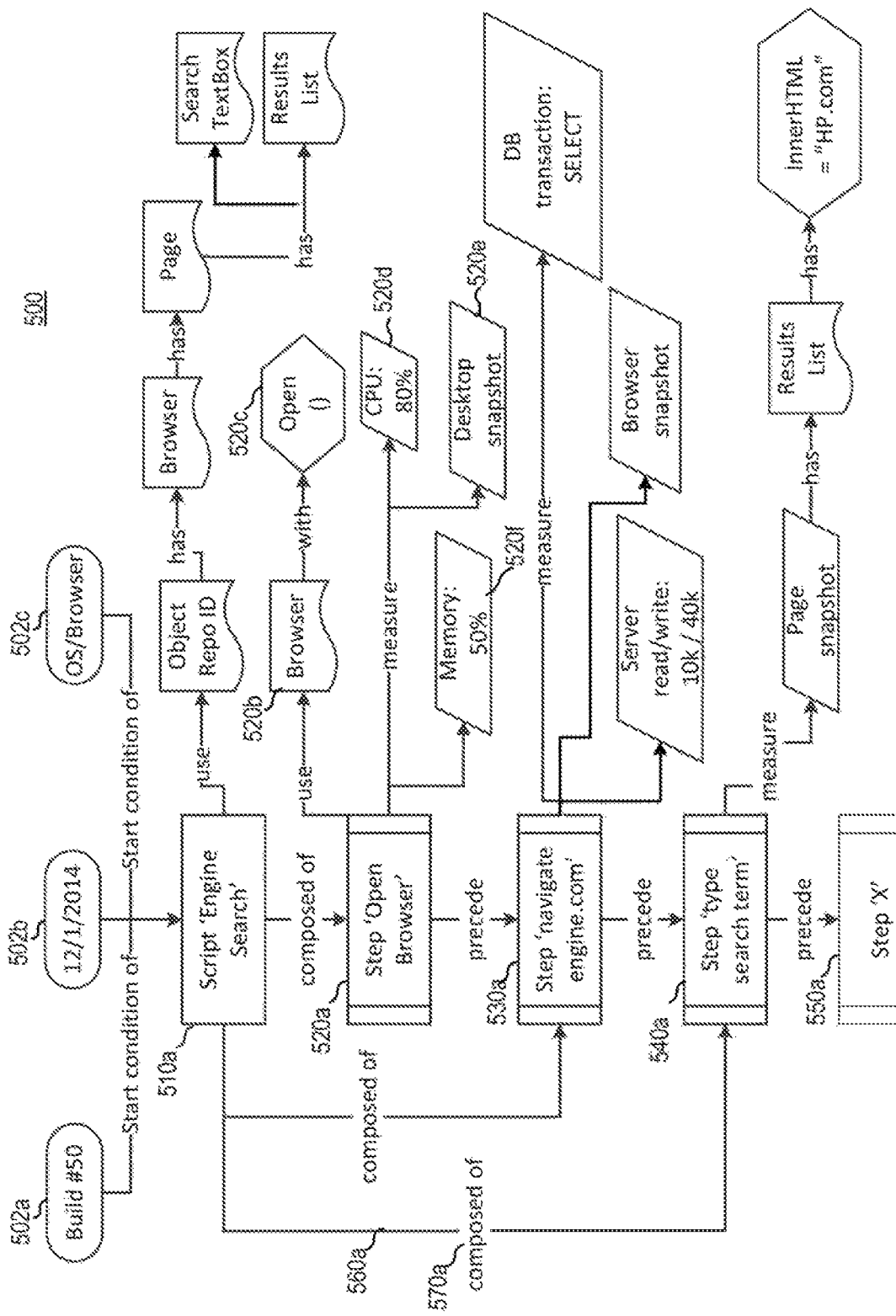
FIG. 5 is an example block diagram of an example directed acyclic graph ("DAG") consistent with disclosed implementations.

FIG. 5 is an example of a block diagram of a DAG 500 consistent with disclosed implementations. For example, DAG 500 may represent data points captured during test executions of an AUT that have been correlated based on a sequence of events that occurred during a particular test execution. Although the example DAG 500 is described below as being managed by, updated by, and/or otherwise utilized by system 100 of FIG. 1 and/or specific components of system 100, other suitable systems and devices for managing, updating, and/or otherwise utilizing DAG 500 may be used. For example, processes described below as being performed by comparable UI object identification device 110 may be performed by comparable UI object identification device 210, comparable UI object identification device 310, and/or any other suitable device. Processes performed with respect to DAG 500 may be implemented in the form of executable instructions stored on a non-transitory machine-readable storage medium and/or by electronic circuitry As shown in FIG. 5, DAG 500 may include data related to a particular test execution(s) of an AUT. As shown in FIG. 5, the data includes data points related to application data 502a (e.g., build number), test data (e.g., the date of the test) 502b, and environment data 502c (e.g., operating system and browser type). DAG 500 also includes a backbone (the collective of test steps 510a, 520a, 530a, 540a, and 550a) which serves as the anchor for each of the vertices in the DAG. In some implementations, each data point may be considered to be a node within the DAG and may be classified based on the categorization of the particular data points (e.g., a backbone node (e.g., a test action node), an application action node, and the like). In this example, the backbone is comprised of test steps performed during test executions of the AUT, but DAGs consistent with disclosed implementations may use any suitable categorization of the data points as the backbone. For example, the backbone may be comprised according to user actions, recorded AUT web pages, UI objects, and/or any other suitable categorization.

The backbone of DAG 500 shown in FIG. 5 is correlated based on a sequence of events that occurred during the particular test execution, and thus the backbone links various ones of test steps 510a, 520a, 530a, 540a, and 550a together. In the example shown in FIG. 5, test step 510a occurred before test step 520a, test step 520a occurred before test step 530a, test step 530a occurred before test step 540a, and test step 540a occurred before test step S550a. Each portion of the backbone (e.g., each test step) in this example is connected via directed edges (only directed edge 560a has been labelled for clarity) from the first test step 510a of the test steps to the last test step 550a of the test steps, and the directed edges have been tagged (only tag 570a has been labelled for clarity) to identify a type of relation between the vertices. For example, test step 510a is directly linked with test steps 520a, 530a, and 540a via the directed edges, and the cause and/or effect of the linkage is shown in the tagging. For example, test step 510a is composed of test steps 520a, 530a, and 540a, test step 520a precedes test step 530a, test step 530a precedes test step 540a, and test step 550a precedes test step 540a.

Furthermore, as shown in FIG. 5, each test step in DAG 500 has additional information that was captured from the testing and/or application environment and was correlated with the particular test step. This additional information (e.g. metadata) has been assigned as vertices (only vertices 520b, 520c, 520d, 520e, and 520f have been labelled for clarity) connected to the backbone. For example, test step 520a relates to opening a browser. In this case, the step of opening the browser included using the browser (an object) and it was used with a specific action (in this case open). Thus, during this particular test execution state the browser was automatically opened by calling the open function of the browser. This information is modelled in DAG 500 not simply by linking the test actions and what follows in terms of the AUT and its environment, but also by the tags that indicate the conceptual meaning of those steps. Each test action and the linking of the actions that follow in response to the test action in terms of the AUT and its environment may be considered to be a node chain of the DAG. Thus, in some implementations, there may be a node chain for each test action performed during the test execution.

Figure 6:
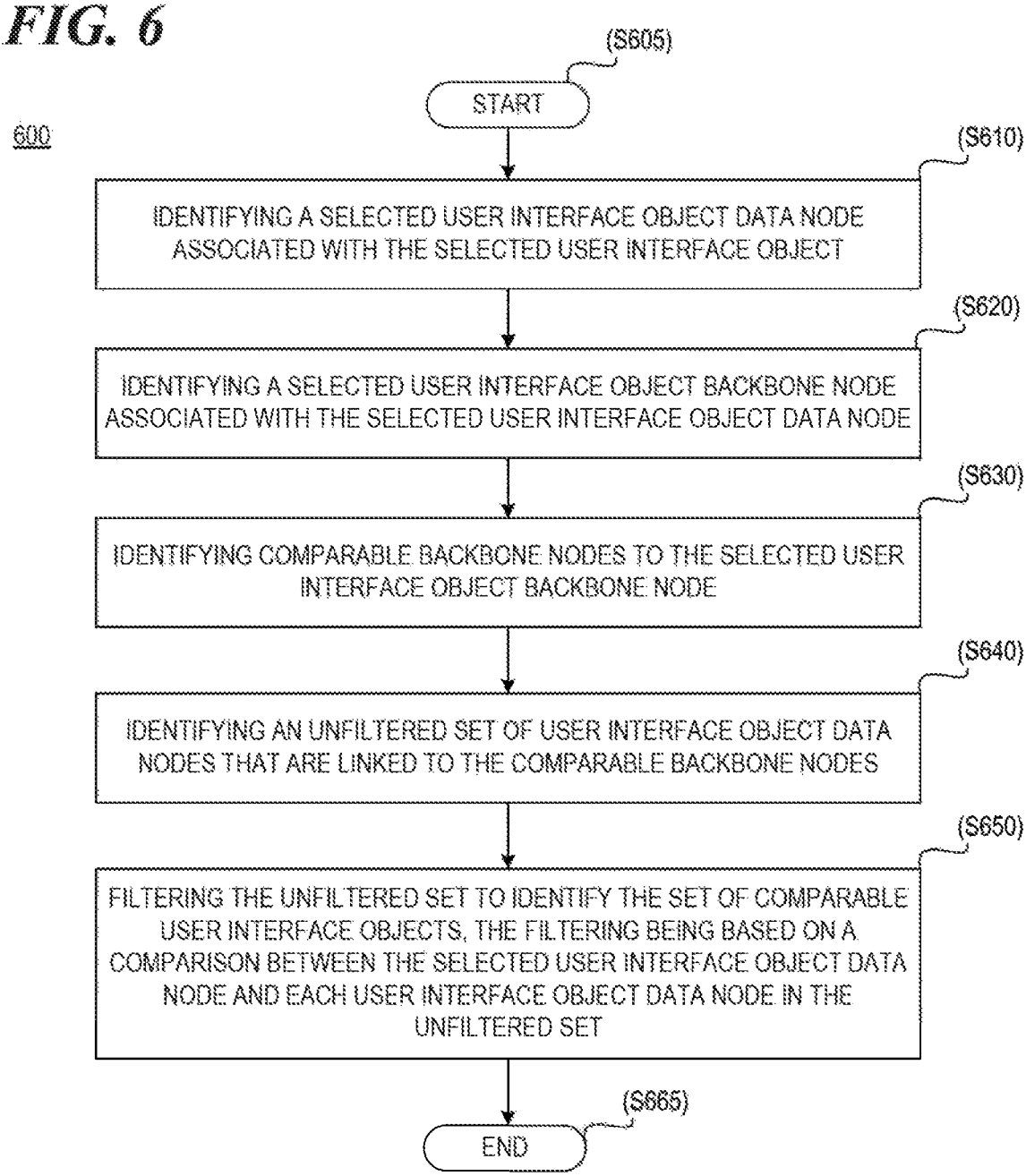
FIG. 6 is a flow chart of an example process for identifying commonalities consistent with disclosed implementations.

FIG. 6 is a flow chart of an example process 600 for identifying commonalities consistent with disclosed implementations. For example, process 600 may be used to identify commonalities based on an AUT context in which a selected UI object was interacted with. Although execution of process 600 is described below with reference to comparable UI object identification device 310 of FIG. 3, specific components of comparable UI object identification device 310, and/or system 100 of FIG. 1, other suitable systems and devices for execution of at least one step of process 600 may be used. For example, processes described below as being performed by comparable UI object identification device 310 may be performed by comparable UI object identification device 110, comparable UI object identification device 210, and/or any other suitable device. Process 600 may be implemented in the form of executable instructions stored on a non-transitory machine-readable storage medium and/or in the form of electronic circuitry.

Process 600 may start (step S605) after data points have been captured and/or correlated using, for example, the methods described above. For example, data correlation engine 330 may correlate each of the data points by generating DAGs for the test executions, where each of the DAGs may include a set of backbone nodes and a set of data nodes connected to the set of backbone nodes.

Process 600 may include identifying a selected UI object data node associated with a selected UI object (step S610). For example, the DAGs generated by data correlation engine 330 may include a selected DAG (e.g., a DAG that represents a test execution corresponding to a selected UI object), where the selected DAG includes a selected UI object backbone node and a selected UI object data node. To identify a selected UI object data node, a comparable UI object identification device (e.g., comparable UI object identification device 310) may query a correlated data structure, such as correlated data points 131 stored in repository 130, to identify a particular data node that corresponds to a selected UI object (e.g., a UI object selected by a tester of an AUT, as described for, example, with respect to FIG. 9). In some implementations, the particular data node may correspond to the selected UI object data node, and may be linked to the selected UI object data node in the selected DAG. Information relating to the selected UI object data node may be returned to the UI object identification device using, for example, network 140.

Process 600 may include identifying a selected UI object backbone node associated with the selected UI object data node (step S620). For example, comparable UI object identification device 310 may perform an additional query of a correlated data structure (e.g., correlated data points 131), may parse the information received in response to the query to identify the selected UI object data node, and/or may use any other suitable method to identify the backbone node associated with the selected UI object. In some implementations, comparable UI object identification device 310 may traverse the selected DAG to identify the backbone node that is linked to the selected UI object data node (i.e., the selected UI object backbone node).

Process 600 may include identifying comparable backbone nodes to the selected UI object backbone node (step S630). A comparable backbone node may be considered to be a backbone node that is similar to the selected UI object backbone node, where the similarity is based on a comparison between test executions of the AUT. For example, comparable UI object identification engine 340 of comparable UI object identification device 310 may automatically compare DAGs to the selected DAG to identify commonalities between the selected DAG and DAGs corresponding to other test executions. In some implementations, comparable UI object identification engine 340 may identify comparable backbone nodes to the selected UI object backbone node by: (1) generating string representations of each of the DAGs; (2) identifying a longest common subsequence of each of the string representations; (3) determining a level of similarity between a test execution corresponding to the selected UI object backbone node and other executions in the test executions based on the longest common subsequence; and/or (4) mapping the longest common subsequence back to a subset of backbone nodes in the set of backbone nodes. Examples of each of these steps are described in further detail below.

Comparable UI object identification device 310 may generate string representations of each of the DAGs in a number of ways. For example, UI identification device may: generate string representations for each of the set of backbone nodes (e.g., each backbone node of each DAG); and/or combine the string representations together to represent a test execution. As used herein, a string representation of a DAG may be considered to be a sequence of characters representing the DAG.

In some implementations, generating string representations for each of the set of backbone nodes may include generating string representations for each data node linked to a particular backbone node. Example string representations may include information related to connected data nodes and may be based on data node type and/or data node attributes of the connected data nodes. In some implementations, comparable UI object identification device 310 may generate the string representations by querying a correlated data structure, such as correlated data points 131 stored in repository 130, to retrieve a set of data nodes connected to a particular backbone node ordered by data node type and by timestamp. For each retrieved data node, comparable UI object identification engine 340 may generate a string representation of the data node using a hash function for that particular node type. The hash function can be used to fix the size of the string representation, and the hash function may be different for each node type. For example, in some implementations, the hash function may be used to reduce the data length for later comparison, as well as to create a uniform basis for that comparison. In some implementations, the hash function may iterate the data node attributes, (e.g., DAG metadata), determine which data node attributes are significant, and minimize each significant data node attributes to a fixed string size. These fixed size strings may be joined as the string representation of the data node.

In some implementations, if two data nodes have the same type and the same significant attributes with the same or similar values, then their string representations should be the same or similar. Take, for example, a data node type of "HTTP request" which may have the attributes of timestamp, HTTP verb, target URL, headers, and body. A similar HTTP request will have the same HTTP verb, target URL, and headers, but the timestamp will likely be different and the body will likely vary to some extent. Thus, the HTTP verb, target URL, and headers may be considered to be significant data node attributes, and the string representation may include a hashed version of the HTTP verb, target URL, and headers.

In some implementations, comparable UI object identification device 310 may combine the string representations of the data nodes to generate the string representation of the backbone node. For example, comparable UI object identification device 310 may join the string representations of each of the data nodes corresponding to a particular backbone node together based on timestamps associated with the data nodes (e.g., in sequential order) to create a string representation for each backbone node. Furthermore, each of the backbone node string representations related to a particular DAG may also be joined together based on timestamps associated with the backbone nodes (e.g., in sequential order) to generate a string representation for the DAG.

Comparable UI object identification device 310 may identify a longest common subsequence of the string representations in a number of ways. In some implementations, comparable UI object identification engine 340 of comparable UI object identification device 310 may identify the longest common subsequence by determining sets of matching character strings and selecting the matching character string that has the most characters.

Comparable UI object identification device 310 may also determine a level of similarity between the test executions based on the longest common subsequence in a number of ways. In some implementations, comparable UI object identification engine 340 of comparable UI object identification device 310 may calculate a similarity value based on a first comparison of a length of the longest common subsequence to a length of each of the string representations, and a second comparison of the similarity value to a threshold value. In some implementations, the first comparison may be a ratio between the length of the longest common subsequence and the length of the string representation. For example, if the ratio exceeds the threshold value, the test executions may be considered similar. While in this example, determining the level of similarity is performed between test executions, the level of similarity may also be determined within test executions themselves using techniques similar to that described above. For example, the level of similarity may be calculated for a single node rather than a number of nodes in a DAG.

Comparable UI object identification device 310 may also map the longest common subsequence back to a subset of backbone nodes in the set of backbone nodes in a number of ways. In some implementations, comparable UI object identification engine 340 of comparable UI object identification device 310 may compare the longest common subsequence with the generated string representations, and may use the location of the longest common subsequence within the string representation to derive the comparable backbone nodes in the DAG of the test execution.

Process 600 may also include identifying an unfiltered set of UI object data nodes that are linked to the comparable backbone nodes (step S640). For example, comparable UI object identification device 310 may identify an unfiltered set by querying a correlated data structure, such as correlated data points 131 stored in repository 130, to identify a number of data nodes (e.g., all or some of the data nodes) that are connected or otherwise associated with the comparable backbone nodes.

Process 600 may also include filtering the unfiltered set to identify the set of comparable UI objects, the filtering being based on a comparison between the selected UI object data node and each UI object data node in the unfiltered set (step S650). In some implementations, the comparison between the selected UI object data node and each UI object data node in the unfiltered set may be based on an assessment of: a set of UI object attributes and values of the selected UI object data node; and/or sets of UI object attributes and values of UI object data nodes in the unfiltered set. For example, a similarity between the selected UI object data node and other UI object data nodes in the unfiltered set may be calculated by: determining a percentage of attributes and values shared by the selected data node and each of the data nodes in the unfiltered set; and/or determining whether the percentage is within a threshold range. For example, to calculate the percentage of shared attributes, comparable UI object identification device 310 may determine the total number of attributes shared by the selected UI object data node and a particular UI object data node and divide the total number of shared attributes by the total number of attributes in the unfiltered set. As another example, to calculate the percentage of shared values, comparable UI object identification device 310 may determine the total number of the same or similar values within the shared attributes and may divide that total number by the total number of shared attributes. In some implementations, the threshold range may be a predetermined range, while in other implementations the threshold range may be defined by a user, such as a user of client device 120 of FIG. 1. If the percentage of a particular UI object data node is within the threshold range, that particular UI object data node may be considered to be a comparable UI object. If not, the particular UI object data node may be considered to not be a comparable UI object, and will not be included in the set of comparable UI objects. Once steps S610, S620, S630, S640, and/or S650 are complete, process 600 may end (step S665).

Figure 7:
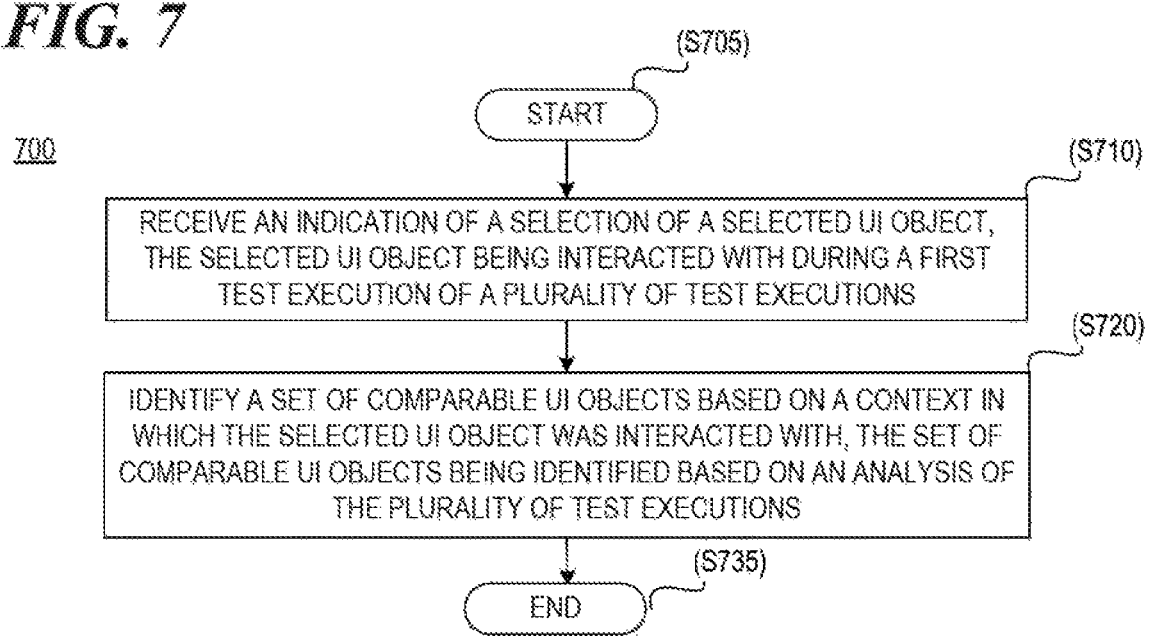
FIG. 7 is a flow chart of an example process for comparable UI object identifications consistent with disclosed implementations.

FIG. 7 is a flow chart of an example process 700 for comparable UI object identifications consistent with disclosed implementations. Although execution of process 700 is described below with reference to comparable UI object identification device 310 of FIG. 3, specific components of comparable UI object identification device 310, and/or system 100 of FIG. 1, other suitable systems and devices for execution of at least one step of process 700 may be used. For example, processes described below as being performed by comparable UI object identification device 310 may be performed by comparable UI object identification device 110, comparable UI object identification device 210, and/or any other suitable device. Process 700 may be implemented in the form of executable instructions stored on a non-transitory machine-readable storage medium and/or in the form of electronic circuitry.

Process 700 may start (step S705) after data points have been captured and correlated into a correlated data structure (e.g., a DAG) using, for example, the methods described above. Process 700 may include receiving an indication of a selection of a selected UI object, the selected UI object being interacted with during a first test execution of a plurality of test executions (step S710). For example, a comparable UI object identification visualization (such as visualization 900 shown in FIG. 9 and described in further detail below) may be displayed on a display device (such as client device 120 of FIG. 1). A tester operating the client device may interact with the UI object identification visualization (e.g., via a button click, text entry, and/or the like) to select an instance of a test execution (e.g., particular DAG and/or a particular backbone node associated with the DAG). In some implementations, the selected instance of the test execution may be considered to be a first test execution of the plurality of test executions. In some implementations, comparable UI object identification device 310 cause the modification of the comparable UI object identification visualization to display UI objects linked to the first test execution, and the tester may select (e.g., via a button click, text entry, and/or the like) a particular UI object of the displayed UI objects. An indication of the selection of the selected UI object (e.g., information related to the selection) may be transmitted via a network (e.g., network 140) to comparable UI object identification device 310. Comparable UI object identification device 310 may receive the indication, and may use the indication to perform additional processing, such as the processing described below with respect to step S720.

Process 700 may also include identifying a set of comparable UI objects based on an AUT context in which the selected UI object was interacted with, the set of comparable UI objects being identified based on an analysis of the plurality of test executions (step S720). In some implementations, the AUT context in which the selected UI object was interacted with may include a type of user interaction and a set of transactions that follow in response to the user interaction. For example, comparable UI object identification device 310 may compare the selected UI object to other UI objects in a correlated data structure (e.g., correlated data points 131 of FIG. 1) using the methods described above. In some implementations, the correlated data structure may include data related to a plurality of test executions, and the plurality of test executions may include a plurality of test execution types (e.g., load tests, manual tests, component tests, functional tests, etc.) and a plurality of AUT versions (e.g., different versions of the AUT). In some implementations, to identify the set of comparable UI objects, comparable UI object identification device 310 may query the correlated data structure for: (1) a set of UI objects that have responsive transactions (e.g., UI changes, database calls, etc. that originated from the user interaction with the particular UI object) that are similar to a selected responsive transaction (e.g., the selected responsive transaction being performed in response to a user interaction performed on the selected UI object); and/or (2) a set of UI objects that have comparable attributes and values to attributes and values of the selected UI object. UI objects returned in response to the query or queries may be considered to be part of the set of comparable UI objects. Once steps S710 and/or S720 are complete, process 700 may end (step S735).

Figure 8:
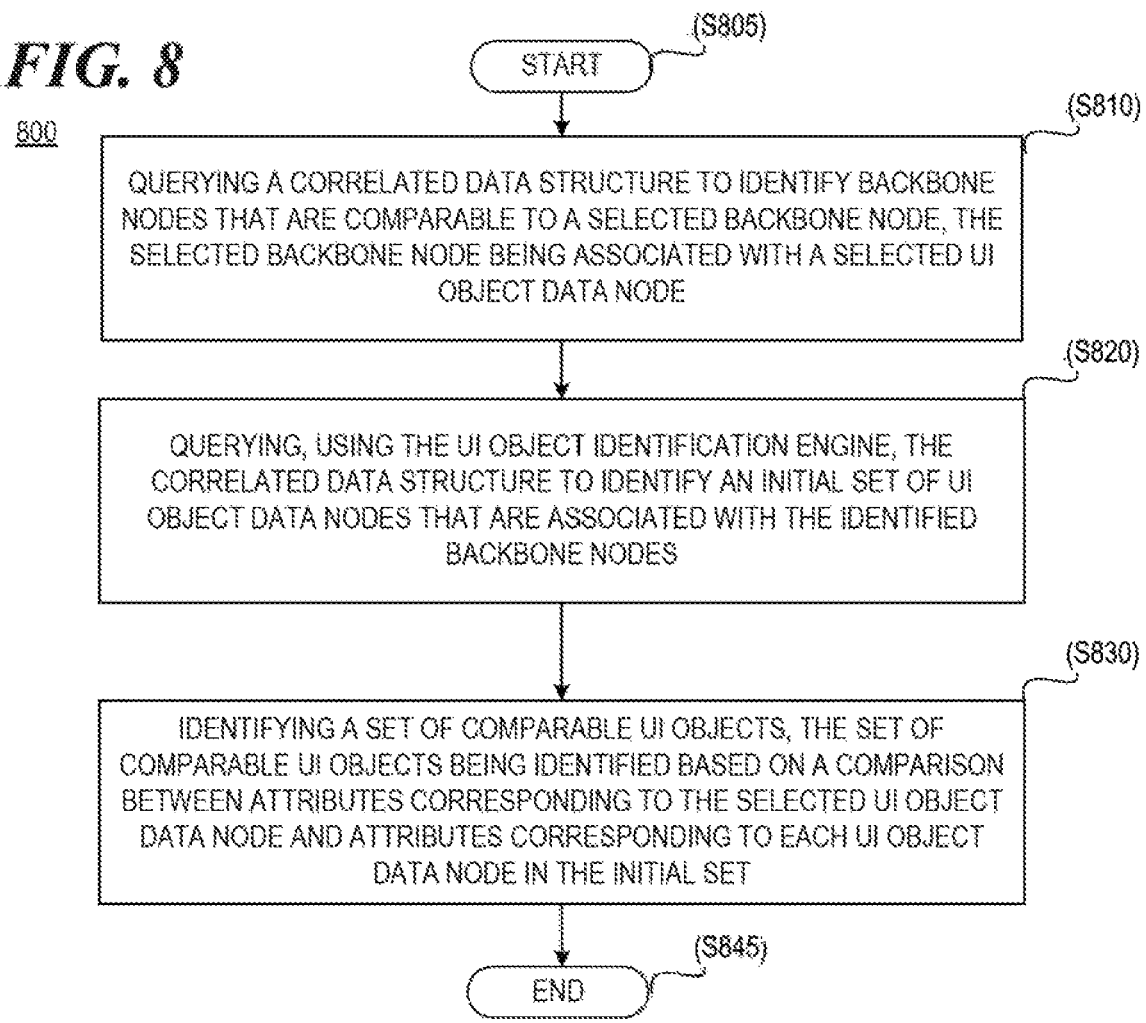
FIG. 8 is a flow chart of an example process for comparable UI object identifications consistent with disclosed implementations.

FIG. 8 is a flow chart of an example process 800 for comparable UI object identifications consistent with disclosed implementations. Although execution of process 800 is described below with reference to comparable UI object identification device 310 of FIG. 3, specific components of comparable UI object identification device 310, and/or system 100 of FIG. 1, other suitable systems and devices for execution of at least one step of process 800 may be used. For example, processes described below as being performed by comparable UI object identification device 310 may be performed by comparable UI object identification device 110, comparable UI object identification device 210, and/or any other suitable device. Process 800 may be implemented in the form of executable instructions stored on a non-transitory machine-readable storage medium and/or in the form of electronic circuitry.

Process 800 may start (step S805) after data points have been captured and correlated into a correlated data structure (e.g., a DAG) using, for example, the methods described above. Process 800 may include querying a correlated data structure to identify backbone nodes that are comparable to a selected backbone node, the selected backbone node being related to a selected UI object data node (step S810). For example, comparable UI object identification engine 340 of comparable UI object identification device 310 may query the correlated data structure to identify backbone nodes that are comparable to a selected backbone node using the methods described above.

Process 800 may also include querying, using the UI object identification engine, the correlated data structure to identify an initial set of UI object data nodes that are related to the identified backbone nodes (step S820). For example, comparable UI object identification engine 340 of comparable UI object identification device 310 may query the correlated data structure to identify an initial set (e.g., an unfiltered set) of UI object data nodes using the methods described above.

Process 800 may also include identifying a set of comparable UI objects, the set of comparable UI objects being identified based on a comparison between attributes corresponding to the selected UI object data node and attributes corresponding to each UI object data node in the initial set (step S830). For example, the set of comparable UI objects may be identified using the methods described above. In some implementations, identifying the set of comparable UI objects may include assigning an identification score for an attribute of a first UI object in the set of comparable UI objects, where the identification score may be based on an analysis of values corresponding to the attribute; and/or causing the generating of a comparable UI object visualization including the identification score. For example, comparable UI object identification device 310 may analyze the values based on a particular attribute's uniqueness and/or distribution of values. In some implementations, the distribution of values may be determined based on the number of discrete values of the attribute divided by the number of objects in the set of comparable objects. In some implementations, the attribute's uniqueness may be determined by calculating the number of UI objects in the set of comparable UI objects that have the same attribute and corresponding value as the particular attribute, and comparing that number to the total number of UI objects in the correlated data set that were captured at the same time and during the same test execution. For example, assume a selected UI object is the text next to an image that states "this is an image," and has attributes "class" with the value "project_text" and the attribute 'element tag' with a value of "div." In this specific example, there are 7 UI objects with the same attribute and same value of "class" and "project_text" and there are 64 UI objects with the same attribute and same value of "element tag and div" in the set of comparable UI objects. Suppose that, in this particular example, there are 240 UI total UI objects captured in the page with the selected UI object. For the attribute "class", the identification score may be calculated as: 1-7/240, or approximately 0.97 or 97%, which may be relatively unique. In contrast, for the attribute "element tag" in this example, the identification score may be calculated as: 1-64/240, or approximately 0.73 or 7%, which is not as unique as the attribute "class." Thus, in this example, the attribute "class" may better identify the UI object than the attribute "element tag." In some implementations, the identification scores may be displayed as part of a comparable UI object visualization generated by a comparable UI object identification device, such as comparable UI object visualization 900 of FIG. 9.

Once steps S810, S820, and/or S830 are complete, process 800 may end (step S845).

FIG. 9 is an example illustration of a comparable UI object identification visualization 900 consistent with disclosed implementations. In some implementations, comparable UI object identification engine 340 of comparable UI object identification device 310 may cause the generation of comparable UI object visualization 900, and visualization 900 may include attributes associated with the set of comparable UI objects and an identification score associated with each of the attributes. Information used to generate comparable UI object identification visualization 900 may be obtained from a comparable UI object identification device (e.g., comparable UI object identification device 310), and visualization 900 may be displayed on a display device, such as display 126 of client device 120.

As shown in FIG. 9, comparable UI object visualization 900 may include information related to the set of comparable UI objects. For example, visualization 900 may include a search area 910, a test step area 920, a user action area 930, a UI object area 940, an application action area 950, and a set of comparable UI object area 960. Search area 910 may function to allow a user to search a correlated data structure (such as correlated data points 131 of FIG. 1) for specific tests. In the example shown in FIG. 9, search area 910 is a text box. However, search area 910 may take any suitable format. For example, search area 910 may include a graphical display including clickable UI objects, drop-down menus, and the like.

Test step area 920 may function to display test steps that occurred during a particular test. For example, test steps related to the test searched for in search area 910 may be displayed in test step area 920. In some implementations, a tester may be able to select a particular test step by interacting (e.g., via mouse click, text entry, etc.) with visualization 900 (in FIG. 9, the "[s]elect a user story and assign it to new product areas" step has been selected). In response to the selection, comparable UI object identification device 310 may cause the population of areas 930, 940, 950, and/or 960 with information related to the particular test step. For example, as shown in FIG. 9, user action area 930 may function to display user actions associated with the selected test step (e.g., a click on "Product Area"), UI object area 940 may function to display UI objects associated with the test step (e.g., a button for "Add Child"), and application action area 950 may function to display application actions performed in response to the test step (e.g., API calls such as "GET /server/product_areas").

In some implementations, visualization 900 may allow a user to select a particular UI object and find similar UI objects. For example, as shown in FIG. 9, a user may interact with visualization 900 to find UI objects similar to "'Add Child' [Button]." In response to the selection, a comparable UI object identification device may cause the population of set of comparable UI object area 960. For example, "'Add Child' [Button]" may be considered to be a selected UI object, and comparable UI object identification engine 340 of comparable UI object identification device 310 may cause a display of a set of comparable UI objects, attributes associated with the UI objects, values associated with the attributes, and/or an identification score associated with each attribute of the set of comparable UI objects. For example, comparable UI object identification engine 340 may identify the set of comparable UI objects and calculate the identification scores using the methods described above, and may transmit that information via a network (such as network 140) to be displayed on a display device (such as display 126 of client device 120). While FIG. 9 shows a specific example of a comparable UI object identification visualization, any suitable comparable UI object identification visualization may be used. For example, visualizations consistent with disclosed examples may use any combination of text and/or graphics to display information related to sets of comparable UI objects.

The disclosed examples may include systems, devices, machine-readable storage media, and methods for comparable UI object identifications. For purposes of explanation, certain examples are described with reference to the components illustrated in FIGS. 1-9. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by this terms. Instead, these terms are used to distinguish one element from another.

Further, the sequence of operations described in connection with FIGS. 1-9 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order, including those described with respect to FIGS. 1-9. Thus, the present disclosure merely sets forth possible examples of implementations, and many variations and modifications may be made to the described examples. All such modifications and variations are intended to be included within the scope of this disclosure and protected by the following claims.

We claim:

1. A system for comparable user interface object identifications comprising:
    a data capture engine to capture data points during test executions of an application under test, the data points including test action data and application action data;
    a data correlation engine to correlate each of the data points with a particular test execution of the test executions, each of the data points being correlated into directed acyclic graphs based on a sequence of events that occurred during the particular test execution; and
    a comparable user interface object identification engine to automatically identify, based on the correlated data points, a set of comparable user interface objects, wherein automatically identifying the set of comparable user interface objects is based on identifying a longest common subsequence of string representations of the directed acyclic graphs.

2. The system of claim 1, wherein correlating each of the data points comprises:
    categorizing each of the data points into at least one of a plurality of types, the at least one of the plurality of types including a first type;
    assigning data points categorized as the first type as backbone nodes of a directed acyclic graph;
    connecting remaining data points as data nodes to the backbone nodes via directed edges based on timestamps associated with the remaining data points, the remaining data points being a set of the data points not categorized as the first type;
    assigning metadata as vertices connected to the backbone nodes; and
    assigning tags to the directed edges to identify a type of relation between the vertices.

3. The system of claim 1, wherein automatically identifying the set of comparable user interface objects comprises identifying commonalities between a selected user interface object and other user interface objects in the correlated data points, the commonalities being identified based on an application under test (AUT) context in which the selected user interface object was interacted with.

4. The system of claim 3, wherein identifying the commonalities based on the AUT context in which the selected user interface object was interacted with comprises:
    identifying a selected user interface object data node associated with the selected user interface object;
    identifying a selected user interface object backbone node associated with the selected user interface object data node;
    identifying comparable backbone nodes to the selected user interface object backbone node;
    identifying an unfiltered set of user interface object data nodes that are linked to the comparable backbone nodes; and
    filtering the unfiltered set to identify the set of comparable user interface objects, the filtering being based on a comparison between the selected user interface object data node and each user interface object data node in the unfiltered set.

5. The system of claim 4, wherein:
    the data correlation engine correlates each of the data points by generating the directed acyclic graphs for the test executions, each of the directed acyclic graphs including a set of backbone nodes and a set of data nodes connected to the set of backbone nodes; and
    the directed acyclic graphs include a selected directed acyclic graph, the selected directed acyclic graph including the selected user interface object backbone node and the selected user interface object data node.

6. The system of claim 5, wherein identifying the comparable backbone nodes to the selected user interface object backbone node includes:
    generating the string representations of each of the directed acyclic graphs;
    identifying the longest common subsequence of the string representations;
    determining a level of similarity between a test execution corresponding to the selected user interface object backbone node and other executions in the test executions based on the longest common subsequence; and
    mapping the longest common subsequence back to a subset of backbone nodes in the set of backbone nodes.

7. The system of claim 4, wherein the comparison between the selected user interface object data node and each user interface object data node in the unfiltered set is based on an assessment of: a set of user interface object attributes and values of the selected user interface object data node; and sets of user interface object attributes and values of user interface object data nodes in the unfiltered set.

8. The system of claim 7, wherein the assessment includes:
    determining a percentage of attributes and values shared by the selected user interface object data node and each of the user interface object data nodes in the unfiltered set; and
    determining whether the determined percentage is within a threshold range.

9. The system of claim 1, wherein automatically identifying the set of comparable user interface objects comprises calculating a similarity value for one or more of the string representations based on a comparison of a length of the longest common subsequence to a length of the one or more of the string representations.

10. A non-transitory machine-readable storage medium including instructions which, when executed by a processor, cause the processor to:
  receive an indication of a selection of a selected user interface object, the selected user interface object being interacted with during a first test execution of a plurality of test executions; and
  identify a set of comparable user interface objects based on an application under test (AUT) context in which the selected user interface object was interacted with, the set of comparable user interface objects being identified based on an analysis of the plurality of test executions and based on identifying a longest common subsequence of string representations of correlated data structures, wherein the correlated data structures are associated with at least the selected user interface object and the set of comparable user interface objects.

11. The non-transitory machine-readable storage medium of claim 10, wherein the plurality of test executions includes test executions of a plurality of test execution types and a plurality of AUT versions.

12. The non-transitory machine-readable storage medium of claim 10, wherein the AUT context in which the selected user interface object was interacted with includes a type of user interaction and a set of transactions that follow in response to the type of user interaction.

13. The non-transitory machine-readable storage medium of claim 10, wherein identifying the set of comparable user interface objects comprises querying a correlated data structure of the correlated data structures for a set of user interface objects that have responsive transactions that are similar to a selected responsive transaction, the selected responsive transaction being performed in response to a user interaction performed on the selected user interface object.

14. The non-transitory machine-readable storage medium of claim 10, wherein identifying the set of comparable user interface objects comprises querying a correlated data structure of the correlated data structures for a set of user interface objects that have comparable attributes and values to attributes and values of the selected user interface object.

15. A computer-implemented method comprising:
  querying, using a user interface object identification engine, a correlated data structure to identify backbone nodes that are comparable to a selected backbone node, the selected backbone node being related to a selected user interface object data node;
  querying, using the user interface object identification engine, the correlated data structure to identify an initial set of user interface object data nodes that are related to the identified backbone nodes;
  identifying a set of comparable user interface objects, the set of comparable user interface objects being identified based on a comparison between attributes corresponding to the selected user interface object data node and attributes corresponding to each user interface object data node in the identified initial set of user interface object data nodes and based on identifying a longest common subsequence of string representations of correlated data structures, wherein the correlated data structures include the correlated data structure.

16. The computer-implemented method of claim 15, wherein identifying the set of comparable user interface objects includes:
  assigning an identification score for an attribute of a first user interface object in the set of comparable user interface objects, the identification score being based on an analysis of values corresponding to the attribute; and
  causing generation of a comparable user interface visualization including the identification score.

17. The computer-implemented method of claim 15, further comprising:
  generating the string representations based on the attributes corresponding to the selected user interface object data node and the attributes corresponding to each user interface object data node.

* * * * *